WILLIAM P. GOOLMAN.
Improvement in Platform-Scales.
No. 115,190. Patented May 23, 1871.
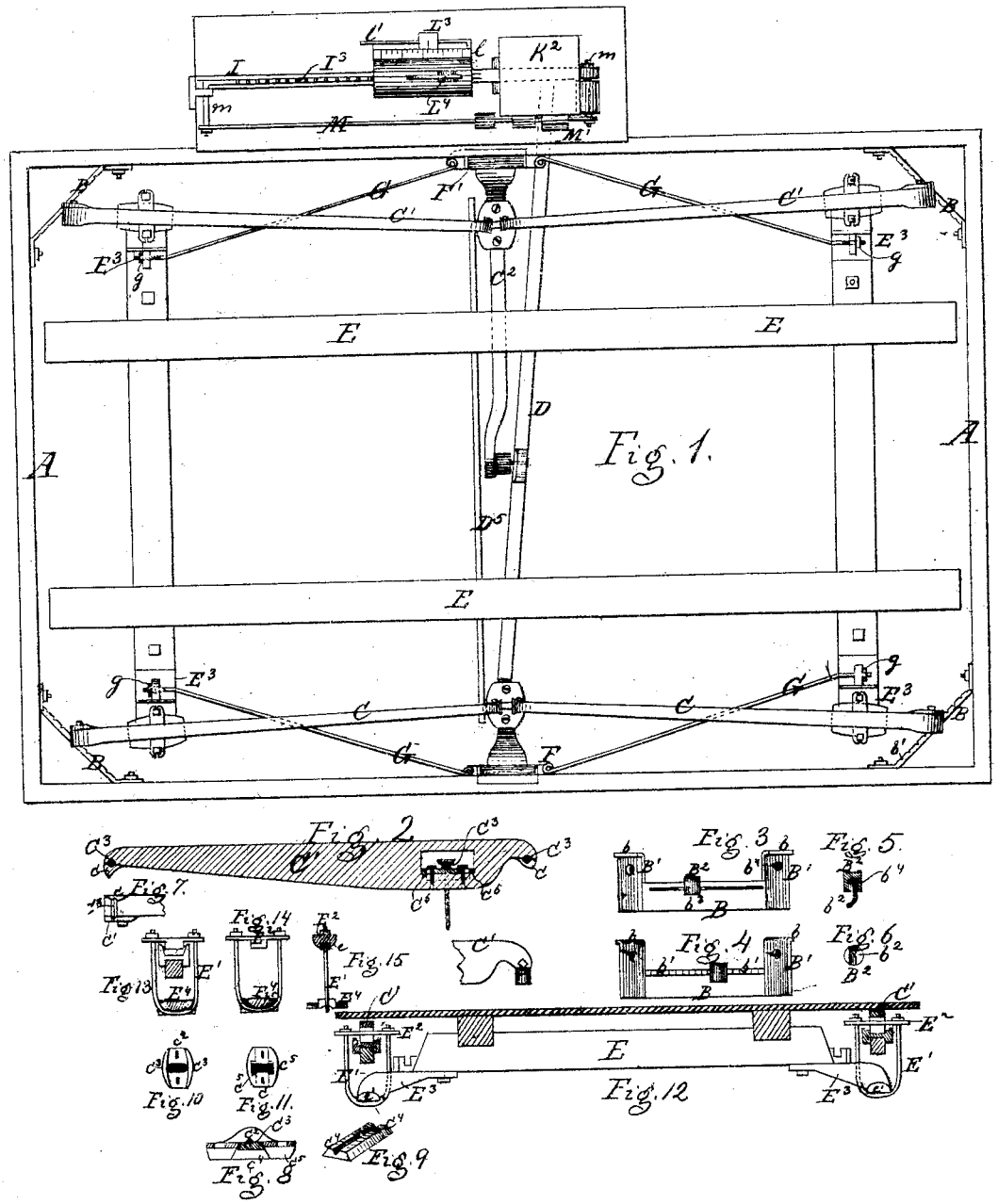

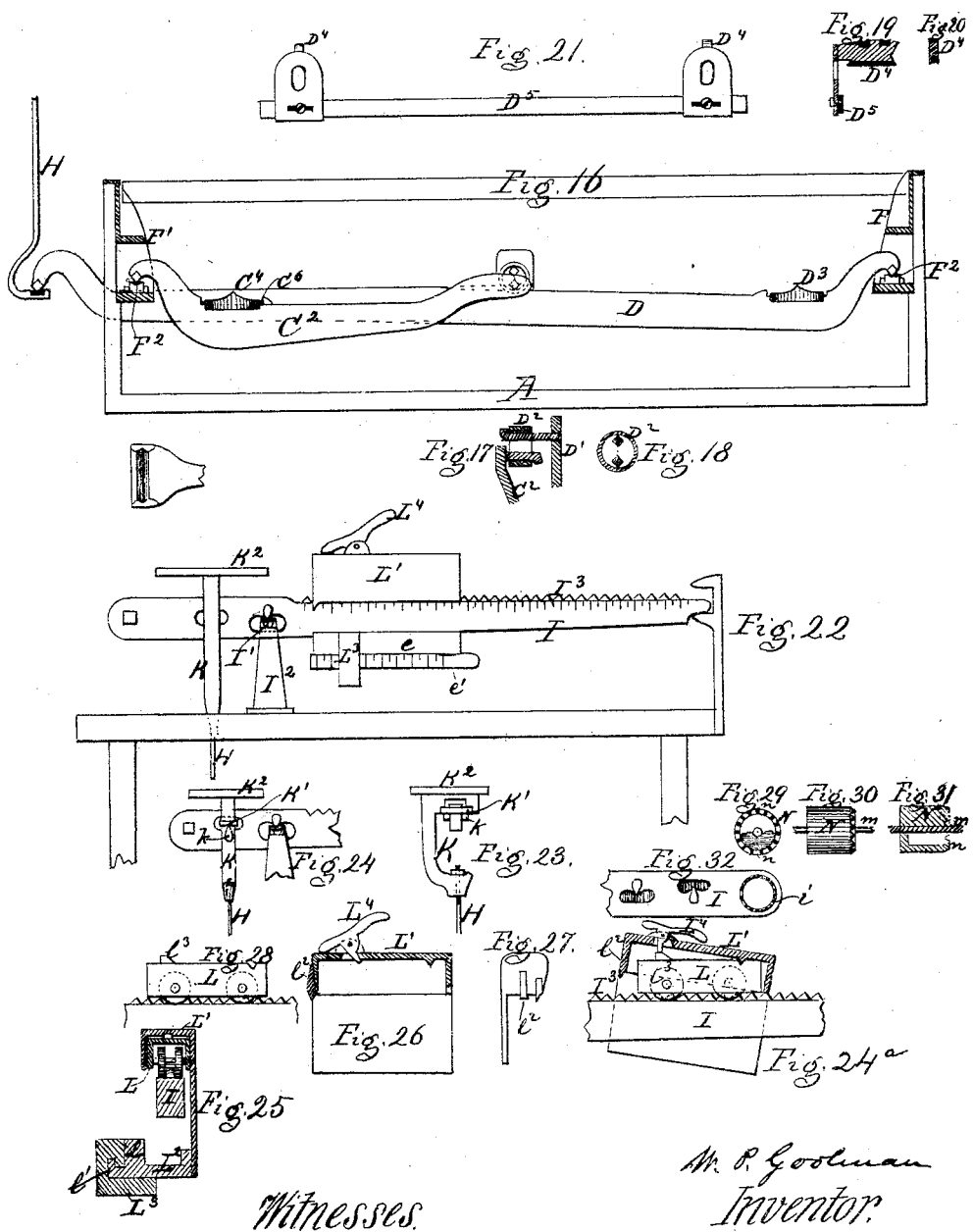

WILLIAM P. GOOLMAN.
Improvement in Platform-Scales.

No. 115,190.   3 Sheets--Sheet 3.   Patented May 23, 1871.

ns,190

UNITED STATES PATENT OFFICE.

WILLIAM P. GOOLMAN, OF KANSAS CITY, MISSOURI.

IMPROVEMENT IN PLATFORM-SCALES.

Specification forming part of Letters Patent No. 115,190, dated May 23, 1871.

*To all whom it may concern:*

Be it known that I, WILLIAM P. GOOLMAN, of Kansas City, in the county of Jackson and State of Missouri, have invented certain Improvements in Platform-Scales; and I do hereby declare that the following is a full, clear, and exact description thereof, reference being had to the annexed drawing making part of this specification, in which—

Figure 34:
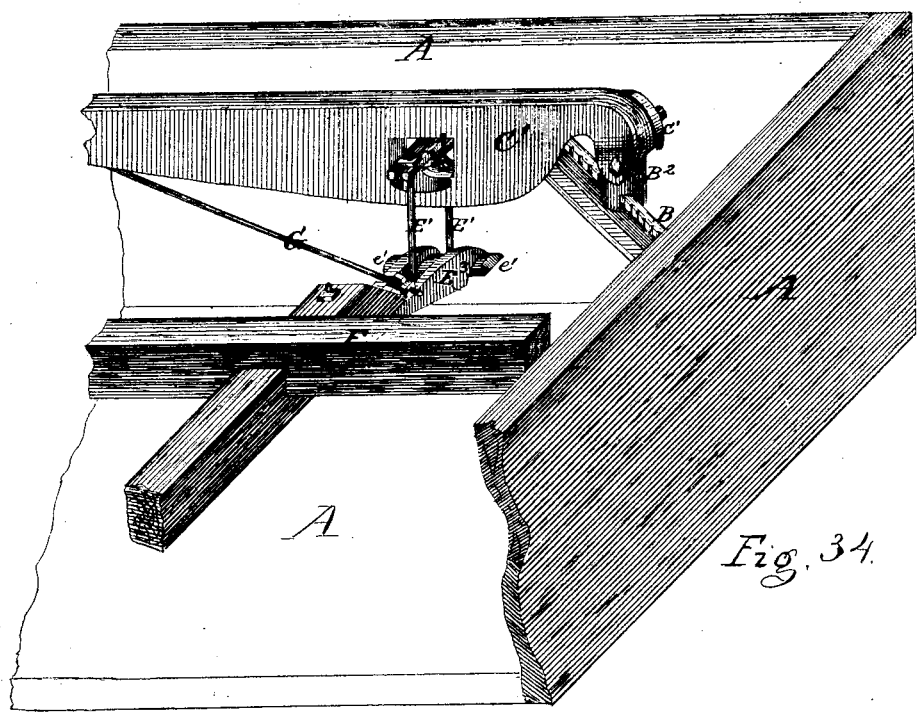
Figure 33:

Figure 1 represents a plan view of the scale without the platform, which is removed to show the arrangement of the parts under it. Figs. 2 to 33 represent views of various details of the scale to be hereafter referred to. Fig. 34 is a perspective view, showing the connection and arrangement of the parts in one corner of the inclosing-box.

The same letters of reference are used in all the figures in the designation of identical parts.

This invention relates to platform-scales; and my improvements consist in the construction, combination, and arrangement of various parts thereof, to be more specifically pointed out in the following description and claims:

The system of levers and the frame with its platform are arranged in a rectangular box, A. In each corner of the latter is a metallic diagonal beam, B, secured at one end to the side and at the other to the end of the box by flanges $B^1$, Figs. 1, 3, and 4, which are constructed with an outwardly-projecting rib, $b$, at the upper end, to rest upon a ledge cut in the walls of the box, for the purpose of giving greater rigidity to the beam, as well as to lessen the strain upon the bolts by which it is secured. The upper edges of these beams lie in the same horizontal plane, and each carries a bearing-block, $B^2$, the bearing-surface in the top of which is parallel to the end of the box. The lower part of these blocks is slotted vertically, Fig. 5, to clasp the beams, which are thickened upon one side along the upper edge, and provided there with vertical notches $b^1$, Figs. 1 and 4, one of which a corresponding projection, $b^2$, Figs. 5 and 6, on the inner face of one of the forks of the block, enters. In this manner the block is prevented from moving horizontally upon the beam, and it is still further secured thereon by means of a wedge or key, $b^3$, which is driven in between the smooth-faced fork of the block and the beam, being held in place by entering a groove, $b^4$, in the latter, as clearly shown in Figs. 3 and 5. These bearing-blocks $B^2$ constitute the fulcrums for four levers, C C and $C^1 C^1$, arranged in pairs along the opposite sides of the box and nearly parallel thereto.

The levers being always of uniform length in scales of the same capacity, and as the length of different boxes, A, must considerably vary to fit different pits, it becomes important that the bearing-blocks should be made adjustable upon fixed supports, which are so constructed and arranged that they will never interfere with the proper action of the levers, no matter at what point the block rests. The use of diagonal beams as supports for the adjustable bearing-blocks $B^2$, fulfills the above requirements, as will be readily understood.

The levers C and $C^1$ are constructed with three knife-edges, as shown in Fig. 2, the bearing-edges of which must lie in the same horizontal plane when the scale is in equipoise. With the knife-edge at one extremity they rest upon the bearing-blocks $B^2$, while with that at the other extremity the levers C bear down upon the long transverse lever D, and the levers $C^1$ upon the short intermediate transverse lever $C^2$, as best seen in Fig. 1. The frame E, with its platform, is suspended from the two pairs of levers at the intermediate knife-edge of each; the distance of which point from the fulcrum is equal to one-fifth of the entire effective length of the lever in the example shown. These knife-edges $C^3$, as well as others hereafter to be referred to, are made of square bars of cast-steel, by preference, and they are confined to the levers in such a manner that each edge may, in turn, be presented to the bearing as the others become dulled or injured. They are also so arranged that their bearing-edges are opposite to and extend across the metal of the lever, from which the important advantages of a long continuous bearing-line and a strong support throughout the entire length of such bearing-line result. At the extremities of the levers the knife-edges are confined in a $\wedge$-shaped groove therein, between two downwardly-projecting ears, $c$ and $c^1$, one of which may form a constituent part of the lever; but the other must be detachable, and may be secured by a screw, as shown in Fig. 7, after the knife-edge has been put in place. The ears are pierced to receive the reduced square end of the knife-edge, and, by projecting beyond the edge of the latter, serve also to confine the levers upon their bearings, or vice versa. The intermediate knife-edge of the levers C and $C^1$ is arranged in a rectangular aperture therein, it being confined between a grooved plate, $c^4$, and the upwardly-projecting ears $c^3$ of a block, $c^2$, which latter is adjustably arranged in the bottom of the aperture. (See Fig. 2.) The block has also downwardly-projecting flanges $c^5$, Figs. 8 and 11, between which the lever snugly fits; and a transverse slot between its ears to expose the bearing portion of the knife-edge. The ends of the plate $c^4$ enter recesses formed in the flanges of the block, (see Fig. 11,) which recesses terminate in the ears with a central $\wedge$-shaped groove for the reception of the upper angle of the ends of the knife-edge, the lower angle of which rests in the $\vee$-shaped groove in the upper surface of the plate $c^4$. The ears, not being penetrated by the knife-edge, form abutments for the latter, and prevent its moving endwise, and projecting, like those at the ends of the levers, beyond the bearing-edge of the knife-edge, confine the bearing which rests upon it.

The point upon which the load presses on the different levers of a platform-scale is usually fixed and unchangeable, so that if it be found on setting up such a scale that the distance between this point and the fulcrum does not bear the exact proportion to the entire effective length in any one of the levers, the latter must be shortened or lengthened, as the case may be. As the respective lengths of the levers are thus changed by this mode of adjustment, the correctness of the scale will be impaired to a corresponding degree. To obviate this difficulty the block $c^2$, carrying the knife-edge on which the load presses, is adjustably secured on the levers, to which end it is made shorter than the aperture or recess in which it sits, and formed with elongated holes, as seen in Figs. 2 and 10, where the tightening-screws pass through. It can thus be moved longitudinally on loosening the screws to bring the knife-edge into the true position with reference to the fulcrum of the lever; having found which it is firmly secured by the screws and keys $c^6$, Figs. 2 and 16, driven in between its ends and the vertical sides of the aperture or recess, so as to make endwise movement impossible.

The frame E is suspended by means of stirrups $E^1$ from the levers C and $C^1$, the legs of the stirrups being hung to a cross-head, $E^2$, which passes through the aperture in the levers, as seen in Fig. 12, and has in its bottom side a suitable bearing surface, $e$, Fig. 15, with which it rests upon the knife-edge. The bow of the stirrups (which are made sufficiently long to prevent them, when oscillated by the endwise movement of the frame, from pulling on the knife-edges and levers) carries a rocker-block, $E^4$, with projecting ends, (see Fig. 15,) upon which are supported the forks of the metallic shoes $E^3$, secured to the cross-bars of the frame. The surfaces of contact between the forks of these shoes and the rocker-blocks are segmental, as at $e'$, Fig. 12, whereby a too free transverse play of the frame is prevented. The rocker-blocks are of such width as to fit pretty snugly between the legs of the stirrups; but in order that they may readily adjust themselves, under transverse play of the frame, to the position of the stirrups so as to throw an equal load upon each leg of each, the transverse groove in their under surface, which partly encompasses the bow of the stirrups, is made flaring at the ends, as shown in Figs. 13 and 14. The shoes $E^3$ are adjustable in the direction of the length of the cross-bar, so that the distance between their bearing-surfaces may be made to exactly correspond with that between the bearing-surfaces of opposite rocker-blocks, which distance will slightly vary with variations in the length of the box, and consequent variations in the positions of the fulcrums of the levers C and $C^1$. The hangers F and $F^1$ are hung to opposite sides of the box A, about midway between its ends. Each carries in a transverse groove of its base-plate a block, $F^2$, the bearing-surface in the top of which is parallel to the sides of the box, and which freely slides endwise in said groove with the movements of the lever it supports. The bearing-block in the hanger F forms the fulcrum for the long transverse lever D, the other extremity of which rests upon the bearing at the lower end of the suspension-rod H, as shown in Fig. 16. The block in the hanger $F^1$ forms the fulcrum for the short transverse lever $C^2$, the other extremity of which is hung by a laterally-projecting knife-edge in a ring, $D^2$, which is suspended from a projecting knife-edge on an adjustable standard, $D^1$, on the lever D. (See Figs. 16, 17, and 18.) Both these knife-edges have a head at their outer ends to confine the ring, such heads being beveled to an edge where they come in contact with the ring so as to reduce the friction of one upon the other. The distance between the fulcrum of the lever D and the point where the lever $C^2$ is hung to it is equal to the entire effective length of the latter, and the pairs of levers C C and $C^1$ $C^1$ press upon the levers D and $C^2$, respectively, at points $D^3$ and $C^4$, equidistant from the respective fulcrums of the latter, so that each pair will exert a force upon the lever D exactly equal at the point where the lever $C^2$ is suspended from it.

It is necessary to bend the levers D and $C^2$ that they may pass under the frame E. The blocks which confine their knife-edges $D^3$ and $C^4$, and which are like the blocks $c^2$ $c^4$ heretofore described, are therefore arranged in a recess in the upper edge of the levers, as clearly shown in Fig. 16, so as to have these knife-edges in the same horizontal plane with those at their extremities when the scale is in equipoise.

The knife-edges $D^3$ and $C^4$ stand at about a right angle to the corresponding knife-edges of the levers C and C¹, necessitating intermediate bearing-blocks or standards D⁴, having one longitudinal bearing-surface in its bottom edge and two transverse bearing-surfaces in its top edge, as clearly shown in Figs. 19 and 20. These standards serve another important office, namely, to elevate the levers C and C¹ so that the frame E can be suspended from them by stirrups of proper length without requiring a box of greater than ordinary depth. As the standards would, without further support, readily topple over, they are constructed with a downwardly-projecting flange upon one side, and there connected together by a rigid brace-rod, D⁵, Figs. 19 and 21, which is, however, adjustable lengthwise, so that the distance between the lower bearing-surfaces of the standards can be made to correspond with that between the knife-edges D³ and C⁴ when the levers are at rest. The end play of the frame E is controlled by check-rods G, of which four are employed, as shown in Fig. 1. They have an eye at one end, and are there attached to studs on the hangers F and F¹, from which they extend, to be connected near the other end to the respective shoes E³ of the frame. For this purpose they pass through a slotted flange on said shoes, at the outside of which flange a nut, g, is screwed upon each rod to check the play of the frame. The graduated beam I is pivoted upon the bearing I¹, which, passing through an aperture in the beam, rests with its ends upon the legs of a fixed support, I², in suitable recesses therein. The knife-edge pivot of the beam has thus, like most of those of the levers heretofore described, a bearing throughout its length, backed by the metal of the beam, so that as the weight is distributed over a longer line of bearing contact the wear upon the knife-edge will be much less than where it has bearings at the ends only in the usual manner. The rod H is suspended from the short arm of the beam by means of a stirrup, K, which hooks over the beam, as shown best in Fig. 23, and rests with its bearing K¹, which passes through an aperture in the beam, upon the knife-edge k. The bearing is inserted with its ends in recesses formed in the legs of the stirrup. (See Fig. 23.) Upon the upper end of the stirrup is a small platform or scale, K², upon which light articles may be weighed. The weight on the long graduated arm of the beam consists of a four-wheeled car, L, the wheels of which run on ways upon each side of a central elevated rack, I³, upon the upper edge of a beam, and a case, L¹, which surrounds the car upon its ends and three of its sides, with one side extended downward along the side and below the lower edge of the beam, as best seen in Figs. 24ᵃ and 25. To the lower end of this downwardly-projecting side of the case L¹ a horizontal piece of metal, L², is bolted, constructed with a longitudinal beam, l, graduated upon its upper edge and another thinner beam, l¹, at its outer edge, and graduated on the side. The latter beam l¹ carries a sliding weight, L³, the upper edge or end of which is flush with the edge of the beam l. (See Fig. 25.)

In scales for weighing stock and other heavy loads the beam I is so graduated that each notch in its rack I³ will count one hundred pounds. The beam l will indicate from one to one hundred pounds, according to the position of the weight L³; and the beam l¹ indicates from one to sixteen ounces in similar manner.

It is very essential to the correctness of indications of the scale that the weight on the main beam, after it has entered one of the notches, shall have no lost motion longitudinally, as the slightest movement in either direction will cause the scale to indicate a greater or lesser weight, as the case may be, than the actual weight. To guard against this lost motion between the beam and weight I insert a rigid steel tooth, l², Figs. 26, 27, in the forward end of the case L¹, accurately fitting the notches in the beam I, and pivot the case upon the top of the car by means of a knife-edge on the former and a V-shaped groove in the top of the latter.

The case L¹ is turned on its pivot to lift its tooth out of the notches of the beam by means of a bell-cranked lever, L⁴, which is pivoted to the case (see Figs. 24ᵃ and 26) with its short arm extending downward through a slot therein, and resting with its end upon a projection, l³, on the car when the case is thus elevated. (See Fig. 24ᵃ.) M is a bar of metal running parallel to the beam I, and secured to the extremities thereof by laterally-projecting bolts m. Upon this bar several weights, M', varying in size, are placed, and used as counterpoises in the ordinary manner. Upon the bolt m, which connects the balance-bar M to the short arm of the beam, a cylindrical weight, N, is placed, constructed with an annular series of teeth, n, upon the end, which comes in contact with the face of the beam, which has a corresponding series of indentations, i, Fig. 32. By reference to Figs. 29 and 31 it will be seen that about one-half of this cylindrical weight is solid and the other half hollow.

In scales of this class used for weighing heavy loads, where the weight of the beam is necessarily quite considerable and its arms comparatively short, sensibility can only be established by so disposing the weight of the beam that its center of gravity shall fall below the point of support and as near to it as practicable. The adjustable lopsided weight N, arranged, as it is, on a horizontal axis secured to the beam, furnishes the means for regulating the position of the center of gravity of the beam by changing the position of its heavier side, lowering or raising it, as may be necessary.

The suspension-rod H is screw-threaded at the upper end, and is secured to the stirrup K by a nut, h, (see Fig. 23,) so that it may be lengthened or shortened to bring the lever D to a horizontal position in setting up the scale.

What I claim as my invention, and desire to secure by Letters Patent, is—

1. In combination with the system of levers C C, C¹ C¹, C², and D, the bearing-connected standards D⁴, substantially as set forth.

2. The combination of the diagonal beams B and bearing-blocks B² adjustable thereon, substantially as and for the purpose set forth.

3. A lever constructed with a square removable knife-edge, when the latter is secured to the former between two ears, $c\ c^1$, one of which is detachable, substantially as and for the purpose set forth.

4. The combination, with a lever, of a knife-edge, $C^3$, plate $c^4$, and block $c^2$, arranged substantially as and for the purpose set forth.

5. The combination of the car L, of the weight and case L¹ thereof, when the latter is pivoted upon the former at one end and constructed with a fixed tooth, $l^2$, at the other, substantially as and for the purpose set forth.

6. In combination with the car L, constructed with a projection, $l^3$, and the case L¹, the bell-crank lever L⁴, substantially as and for the purpose set forth.

7. In combination with the beam I, the lopsided weight N, when arranged on a horizontal axis secured to the beam so as to operate substantially as set forth.

In testimony whereof I have signed my name to this specification in the presence of two subscribing witnesses.

WILLIAM P. GOOLMAN.

Witnesses:
   D. P. HOLLOWAY,
   B. EWD. J. EILS.